United States Patent [19]

Kawashima

[11] Patent Number: 4,782,681

[45] Date of Patent: Nov. 8, 1988

[54] METHOD OF ROLLING A SCREW WITH GROOVE FOR SELF-LOCKING

[75] Inventor: Masao Kawashima, Funabashi, Japan

[73] Assignee: JSM Screw Co., Ltd., Tokyo, Japan

[21] Appl. No.: 77,838

[22] Filed: Jul. 27, 1987

Related U.S. Application Data

[62] Division of Ser. No. 909,399, Sep. 19, 1986.

[30] Foreign Application Priority Data

Nov. 22, 1985 [JP] Japan .................. 60-263223
Jun. 25, 1986 [JP] Japan .................. 61-146797

[51] Int. Cl.$^4$ .............................................. B21H 3/06
[52] U.S. Cl. ...................................................... 72/88
[58] Field of Search ................. 72/88, 90, 92, 93, 103, 72/104, 469

[56] References Cited

U.S. PATENT DOCUMENTS

| Re. 27,678 | 6/1973 | Orlomoski | 72/88 |
|---|---|---|---|
| 3,197,989 | 8/1965 | Cooper | 72/104 |
| 3,261,043 | 7/1966 | Guthmann | 72/88 |
| 3,517,717 | 6/1970 | Orlomoski | 72/88 |
| 3,653,241 | 4/1972 | Orlomoski | 72/469 |
| 3,850,215 | 11/1974 | Orlomoski | 72/88 |
| 3,872,700 | 3/1975 | Matej | 72/469 |
| 4,353,233 | 10/1982 | Chapman | 72/469 |

FOREIGN PATENT DOCUMENTS

| 19492 | 5/1981 | Japan . |
|---|---|---|
| 28008 | 2/1983 | Japan . |
| 58913 | 4/1985 | Japan . |
| 747599 | 7/1980 | U.S.S.R. ............... 72/90 |

Primary Examiner—Daniel C. Crane
Attorney, Agent, or Firm—Jordan and Hamburg

[57] ABSTRACT

A method of manufacturing a self-locking threaded element includes the steps of disposing a blank element in which the self-locking threads are to be formed between two spaced rolling dies, contacting the start ends of each die with the blank element such that one die extends from its start end to its finish end in one direction and the other die extends from its start end to its finish end in an opposite direction, applying a pressure to the rolling dies, moving the two rolling dies in opposite directions a first distance, rotating the blank element a first amount as the two dies are moved the first distance causing the two oppositely moving dies to form a helical first groove in the rotating blank element, moving the dies in such opposite direction a second distance, rotating the blank element a second amount as the two dies are moved such second distance causing the two oppositely moving dies to superimpose a second deeper groove over alternate first grooves such that the deeper grooves define the flanks of a thread having a pitch which is twice that of the first pitch and with the outer radial crest ends of the thread having a self-locking center groove defined by the first groove.

19 Claims, 11 Drawing Sheets

5000-TIME CONTINUOUS IMPACT TEST DATA

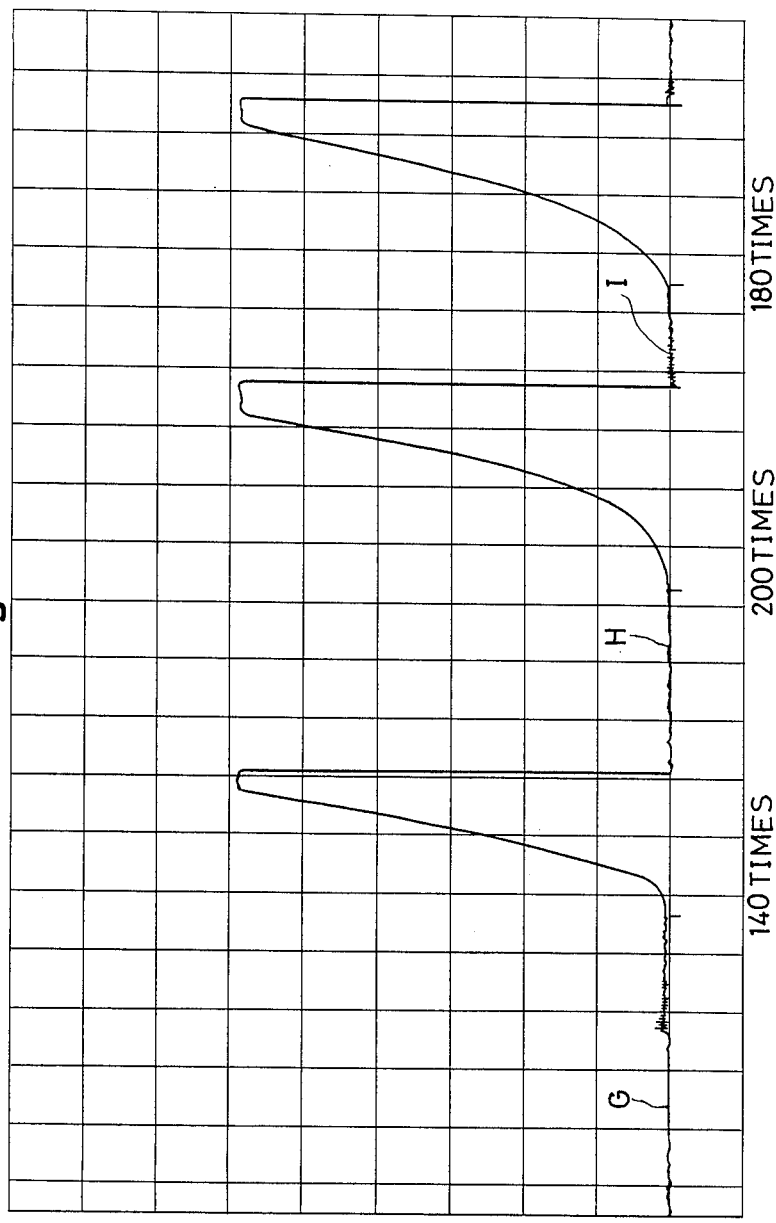

METHOD OF ROLLING A SCREW WITH GROOVE FOR SELF-LOCKING

This is a division, of application Ser. No. 909,399, filed Sept. 19, 1986.

FIELD OF THE INVENTION

This invention relates to threaded articles such as bolts and nuts and, more particularly, to a screw with a groove for self-locking to prevent loosening after the screw has been tightened, and a method and rolling flat die used for manufacturing the same.

DESCRIPTION OF THE PRIOR ART

Well-known threaded articles of the self-locking type noted above are disclosed in Japanese Patent Publication 19492/1981, Japanese Patent LaidOpen 28008/1983 and Japanese Utility Model Laid-Open 58913/1985. These disclosed threaded articles of the self-locking type have a basic structure in which the thread has a groove cut in the radial direction from the top. With this structure, when male and female threaded members having different flank angles are screwed together, the portions of the thread facing each other on the opposite sides of the groove are elastically deformed by the urging force acting between the two threaded members, and an increase of the frictional resistance of the contact surfaces of the threads and a self-locking effect can be obtained owing to the elastic restoring produced at this time. This self-locking mechanism which depends on the sole elastic restoring force due to the elastic deformation of the facing portions, has a fatal drawback in that the self-locking effect is lost in the repeated use of the threaded member in case when the elastic restoring force of the facing portions on the opposite sides of the groove is reduced or when there occurs a plastic deformation.

SUMMARY OF THE INVENTION

The invention has been intended to overcome the above drawback, and its object is to provide a screw with a groove for self-locking, which can reliably maintain its self-locking function even when it is repeatedly used.

Another object of the invention is to provide a screw with a groove for self-locking, which can be readily manufactured by rolling die means.

A further object of the invention is to provide a screw with a groove for self-locking, which can provide a self-locking effect without need of any auxiliary part but by itself.

A still further object of the invention is to provide a method of manufacture of a screw with a groove of the self-locking type on a threaded article.

A yet further object of the invention is to provide a rolling flat die used for the manufacture of a screw with a groove of the self-locking type on a threaded article.

The above and other objects and features of the invention will become more apparent from the description of the invention with reference to the accompanying drawings.

BRIEF DESCRIPTION OF THE DRAWINGS

FIGS. 23 and 24 are graphs showing results of tests on a screw with groove and a commercially available bolt, with FIG. 23 being these on the screw with groove, and FIG. 24 being those on the commercially available bolt.

DESCRIPTION OF THE PREFERRED EMBODIMENTS

To attain the above objects of the invention, there is provided a screw with a groove for self-locking having a thread consisting of an upper portion and a lower portion in an axial section, the lower portion having opposite side surfaces, defining a flank angle of the screw, the upper portion having opposite side surfaces which are substantially perpendicular to the axis of the screw, the upper portion having a buffer groove having a predetermined width and formed in the radial direction from a central portion of the top, the lower portion serving as a rigid thread portion with the side surfaces thereof in contact in a rigid state with a counterpart threaded member in a screwed relation to the counterpart thread member, the upper portion serving as an elastic thread portion such that its portions facing each other on the opposite sides of the buffer groove are elastically deformable in the direction of reducing the width of the buffer groove so that its opposite surfaces are in elastic contact with the counterpart threaded member, an effect of prevention of the looseness of the screw being thereby obtained by a combined effect of the rigid and elastic thread portions.

A separately prepared round rod is clampingly set between movement start ends of pair rolling flat dies, each of which has distinct front and rear portions in the direction of its progress, the front portion being formed on the inner side with a set of small parallel threads for preliminary processing inclined in coincidence with the helical lead angle of the screw and formed at a uniform pitch, the rear portion being formed on the inner side with a set of large parallel threads for finish processing formed as extensions of every other ones of and at twice the pitch of the small threads for preliminarily processing, and the two rolling flat dies are moved in opposite directions in a clamping relation to the round rod, thus effecting a first step of preliminarily forming the outer periphery of a rotating round rod with two continuous small threads having a predetermined pitch, and a second step, performed subsequent to the first step, for regularly forming a large thread in super-imposition on every other one of and at double the pitch of the two small threads, thereby forming a buffer groove in the top of the large thread with plastic deformation of the two small threads. In this way, the screw with groove for self-locking according to the invention is manufactured.

Now, specific examples of the mode of practice in connection with the screw with groove for self-locking according to the invention will be described in detail with reference to the drawings.

Figure 1:
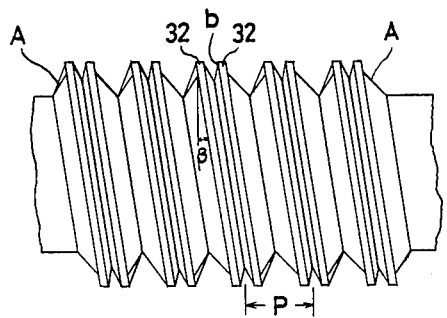
FIG. 1 is a side view showing a member with a male thread to illustrate a first embodiment of the screw with groove according to the invention.
Figure 2:
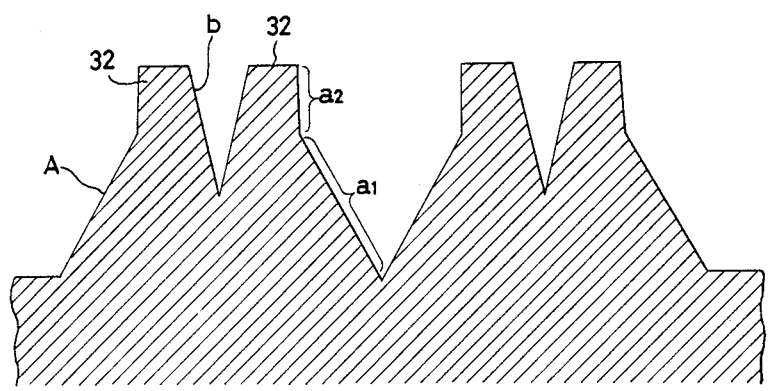
FIG. 2 is a sectional view, on an enlarged scale, showing an essential part of thread.
Figure 3:
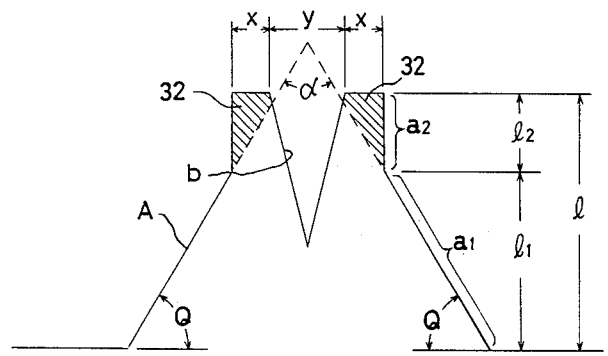
FIG. 3 is a view for explaining the shape and size of thread.

Referring to FIGS. 1 and 2, reference symbol A designates a thread of the male thread member made of metal. In its axial section, the thread A has a lower portion a1 and an upper portion a2. Of the two portions, the lower portion a1 has side surfaces defining the flank angle $\alpha$ of the thread as shown in FIG. 3. The upper portion a2 has opposite side surfaces substantially parallel to the radial direction. This portion has a buffer groove b of a V-shaped sectional profile cut in the radial direction from a central portion of the top. The upper portion a2 thus has opposite side portions 32 facing each other on the opposite sides of the groove b.

Dimensions of various parts of the thread of the male thread member are determined as follows.

The flank angle $\alpha$ and rise angle Q of the thread are determined in conformity with JIS or equivalent standards. The height l of the thread A is lower than the level of the apex of the flank angle.

In the illustrated example, the ratio of the heights l1 and l2 of the lower and upper portions a1 and a2 constituting the total height l of the thread A is set to be substantially 2:1. As for the opposite side portions 32 of the upper portion a2, defined by the V-shaped buffer groove b, their width x is related to the width y of the opening of the V-shaped buffer groove b such that $2x \leq y$, and $(2x+y)$ is set equal to one half the pitch.

Figure 4:
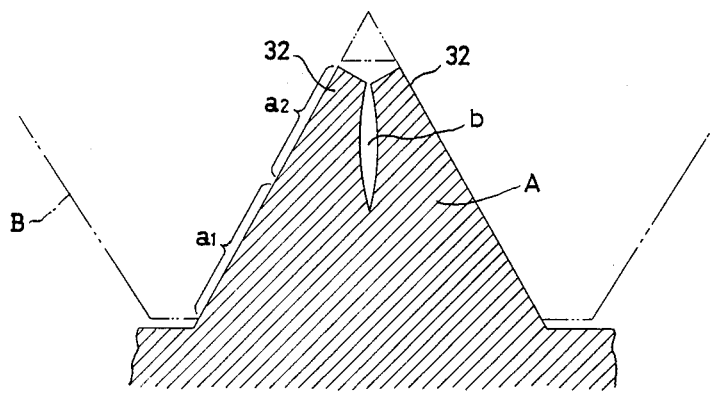
FIG. 4 is a sectional view showing the thread in a screwed state.
Figure 5:
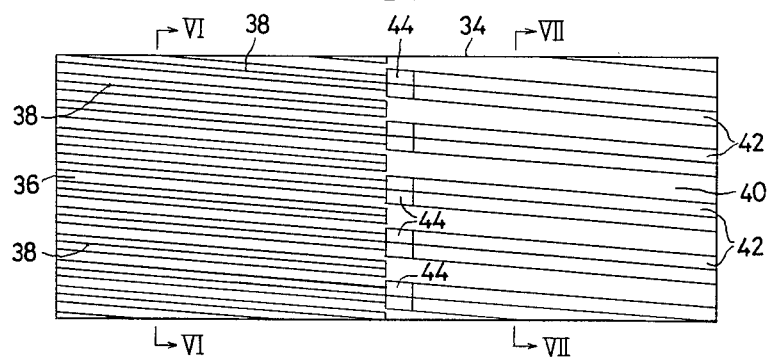
FIG. 5 is an internal elevational view showing a first embodiment of the rolling flat die according to the invention.
Figure 6:
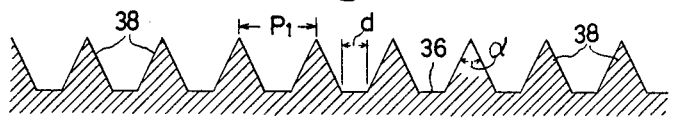
FIGS. 6 and 7 are fragmentary enlarged scale sectional views taken along line VI—VI and VII—VII in FIG. 5.
Figure 7:
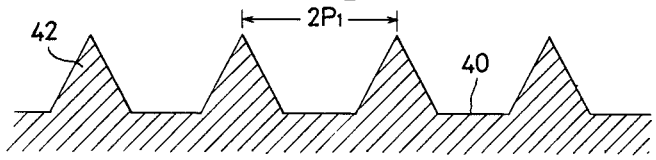

FIG. 4 shows the male thread member having the above construction in a state screwed in a female thread member. Designated at B is the thread of the female thread member.

In the operation of screwing together two threaded members, of the opposite side portions 32 of the upper portion a2 of the thread A of the male thread member, the portions on the outer side of the planes defining the flank angle a, as shown shaded in FIG. 3, are urged in contact with the corresponding sides of the thread B of the counterpart female thread member when they are introduced into the gap with respect to the thread B. Therefore, the opposite side portions 32 on the opposite sides of the V-shaped buffer groove b are inwardly elastically deformed. At the end of the tightening, as shown in FIG. 4, the portions 32 are elastically deformed such that their side surfaces lie in the same planes as the side surfaces of the lower portion a1 and are urged together with the side surfaces of the thread of the male screw.

With the above structure of the male thread member, the lower and upper portions a1 and a2 of the thread A are both urged against the side surfaces of the thread of the counterpart threaded member, i.e., female thread member. At this time, the lower portion a1 acts as a rigid thread portion in contact in a rigid state with the counterpart threaded member, while the upper portion a2 acts as an elastic thread portion with the elastically deformed opposite side portions 32 in forced contact with an elastic restoring force with the counterpart threaded member. Thus, with respect to an axial compressive or tensile force, the lower portion a1 obtains a maximum area contact to produce a satisfactory frictional resistance owing to the flank angle coincident with the counterpart thread. With respect to a vibratory force, the upper portion a2 which is in forced contact with an elastic restoring force with the counterpart thread obtains a maximum area contact.

In other words, with the above construction of the male thread member the side surfaces of the thread effect a total area contact with the side surfaces of the counterpart thread when the two threaded members are screwed together, while the contact in the axial section is substantially the same as in the case of the thread of the prior art threaded member. Further, the lower portion a1 acting as rigid thread portion and upper portion a2 acting as elastic thread portion provide a combined stress against an external force. Thus, it is possible to obtain a high tightening force and hence an excellent looseness prevention effect can be obtained.

In the above embodiment the buffer groove b of the upper portion a2 has had a V-shaped sectional profile. However, it is possible to form a groove having a rectangular sectional profile as the buffer groove. Further, the buffer groove is desirably deep to such an extent that the rigidity of the lower portion a1 is not spoiled. This is advantageous from the standpoint of the elastic deformation. Further, the groove should have an effective width of opening to permit elastic deformation of the opposite side portions 32.

Further, while the above embodiment has concerned with a male thread member, the same effects can be obtained when the invention is applied to a female thread member. Further the invention may be applied not only to metal screws but also plastic, ceramic material or wooden screws.

FIGS. 5 to 8 illustrate a first embodiment of the rolling flat die according to the invention, which is directly used for the manufacture of a screw with groove according to the invention.

The rolling flat die 34 of this embodiment has distinct front and rear portions in the direction of its progress at the time of operation. The front portion is formed on its inner clamping surface 36 with a set of parallel small threads 38 for preliminary processing inclined it coincidence with the helical lead angle $\beta$ of the thread A. These small threads 38 are formed at an uniform pitch P1 and with a predetermined distance d provided between adjacent ones. The rear portion is provided also on its inner clamping surface 40 with a set of parallel large threads 42 for finish processing as extensions of every other ones of and at twice the pitch 2P1 of the small threads 38.

The die 34 is made of a tool steel or a superhard alloy. The large threads 42 for finish processing have the same flank angle α as the small threads 38 for preliminary processing. In order to permit smooth progress from the small threads 38 which have a small height to the large threads 42 which have a large height, the large threads 42 are provided with a rising slope section 44 as a bridging portion adjacent to the small threads.

FIGS. 9 to 12 illustrate a second embodiment of the rolling flat die according to the invention.

The rolling flat die 46 of this embodiment, like the first embodiment has a set of parallel small threads 50 for preliminary processing on the inner clamping surface 48 of the front portion and a set of large threads for finish processing on the inner clamping surface 52 of the rear portion. In this embodiment, however the threads 50 and 54 are formed closely, i.e., without any distance provided between adjacent ones of them. In addition, the inner clamping surface 52 of the rear portion is stepped down with respect to the inner clamping surface 48 of the front portion such that the tops 50' and 54' of the small and large threads 50 and 54 are flush with one another.

Figure 13:
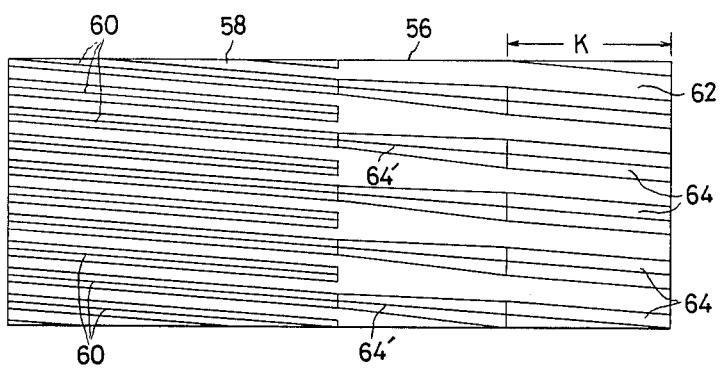
FIGS. 13 and 14 are an elevational view and a plan view, respectively, showing a third embodiment of the rolling flat die according to the invention.
Figure 14:
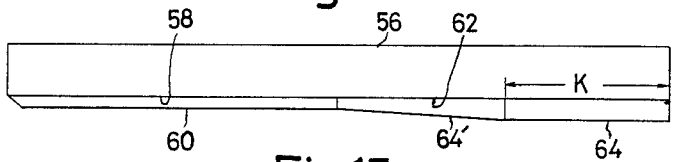

FIGS. 13 and 14 illustrate a third embodiment of the rolling flat die according to the invention. In the die 56 of this embodiment, parallel small threads 60 for preliminary processing on the inner clamping surface 58 of the front portion have a constant height, but parallel large threads 64 for finish processing on the inner clamping surface 62 of the rear portion have an inclined sectional profile section 64' with the height thereof progressively increased from the height of the small threads 60 for preliminary processing to a maximum height at a position ahead of the other end by a distance at least equal to the length K of circumference of round rod Y as workpiece.

Figure 15:
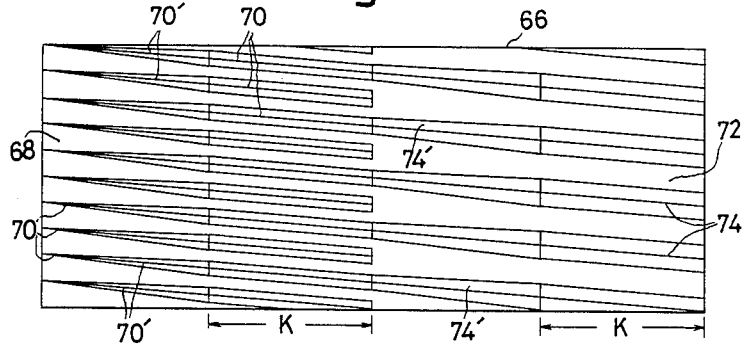
FIGS. 15 and 16 are an internal elevational view and a plan view, respectively, showing a fourth embodiment of the rolling flat die according to the invention.
Figure 16:
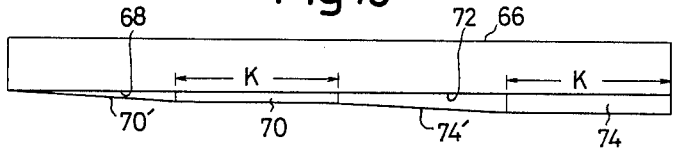

FIGS. 15 and 16 illustrate a fourth embodiment of the rolling flat die according to the invention. In the die 66 of this embodiment, small threads for preliminary processing on the inner clamping surface 68 of the front portion has an inclined sectional profile section 70' with the height thereof being zero at the start end in the direction of progress of the die and progressively increased up to a position ahead of the other end by a distance at least equal to the length K of circumference of the round rod Y. Also, large threads 74 for finish processing on the inner clamping surface 72 of the rear portion has an inclined sectional profile 74' have an inclined sectional profile section 74' with the height thereof progressively increased from the end adjacent to the small threads 70 for preliminary processing up to a position ahead of the other end by a distance at least equal to the length K of the round rod Y.

Figure 8:
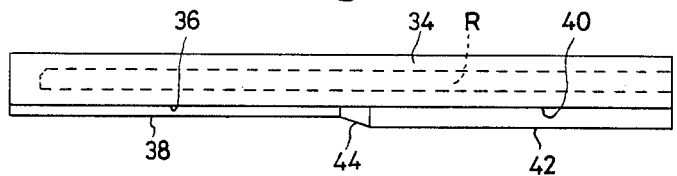
FIG. 8 is a plan view showing the first embodiment of the rolling flat die according to the invention.
Figure 9:
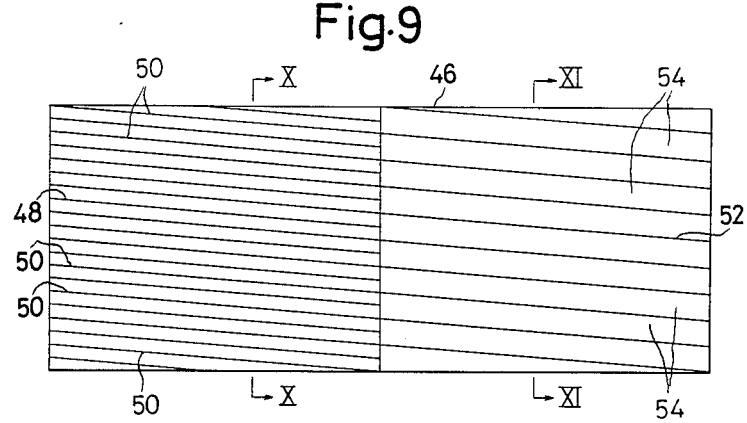
FIG. 9 is an internal elevational view showing a second embodiment of the rolling flat die according to the invention.
Figure 10:
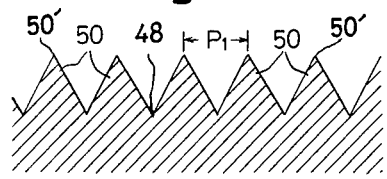
FIGS. 10 and 11 are fragmentary enlarged scale sectional views taken along line X—X and XI—XI in FIG. 9.
Figure 11:
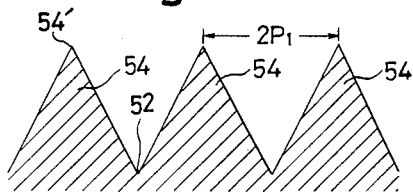
Figure 12:
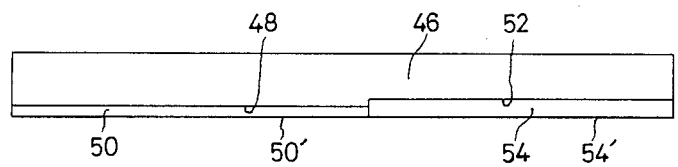
FIG. 12 is a plan view showing the second embodiment of the rolling flat die according to the invention.

FIG. 8 shows a further embodiment of the rolling flat die according to the invention, in which the die 34 has a heater accommodation bore or cooling bore R.

Figure 18:
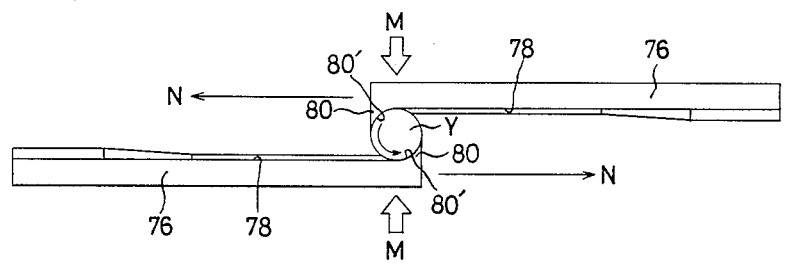

FIG. 18 shows a further embodiment of the rolling flat die 76 according to the invention. The die 76 of this embodiment has a round rod reception seat 80 provided at the start end of the inner clamping surface 78 of the front portion.

Figure 17:
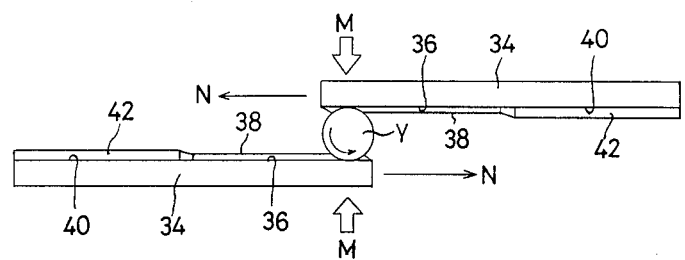
FIGS. 17 and 18 are views illustrating an embodiment of the method of manufacture according to the invention.

Now, a method of manufacturing a screw with groove using a pair of rolling dies according to the invention will be described with reference to FIG. 17.

Figure 19:
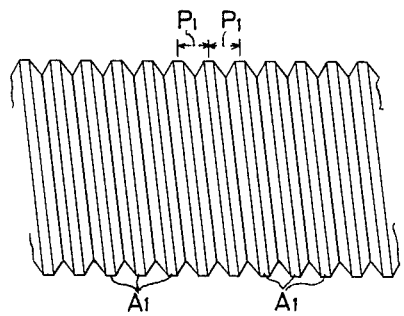
FIG. 19 is a view showing small threads of preliminary processing formed on the outer periphery of a round rod in a first step of a first embodiment of the method of manufacture according to the invention.
Figure 20:
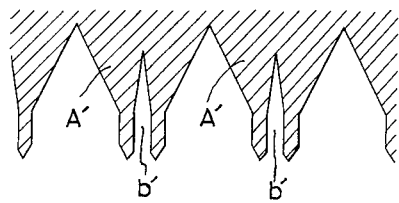
FIG. 20 is a fragmentary enlarged scale sectional view showing the thread of a different screw with groove.

First, the two rolling dies are disposed in a vertical or horizontal symmetrical arrangement such that their start ends face each other. Then, a metal round rod Y which is separately prepared is set in a clamped state between the facing ends of the dies, i.e., start ends of small threads 38 for preliminary processing on the facing inner clamping surfaces 36 of the front portions of the dies 34, In this state, a pressure is applied to the system from the opposite sides as shown by arrows M. Then the dies 34 are moved in opposite directions as shown by arrows N. In consequence, there are effected a first step, in which the outer periphery of the round rod Y forcively rotated in the counterclockwise direction shown by arrow is preliminarily formed with two continuous small threads A1 having a predetermined pitch P1, as shown in FIG. 19, as the round rod Y is rolled between the small threads 38 for preliminary processing on the inner clamping surfaces 36 of the front portions of the two dies 34, and a second step, which is effected immediately after the first step, and in which a large thread A is formed regularly in superimposition on every other one of and at double the pitch 2P1 = P of the two small threads A1 as the round rod is rolled between the large threads 42 for finish processing on the inner clamping surfaces 40 of the rear portions of the dies 34. In this way, a screw with groove for self-locking as shown in FIG. 1 can be obtained, which has an elastically deformable buffer groove b formed on the central portion of the top of the large thread A with plastic deformation of the two small threads A1.

Where a pair of dies 46 are used, a screw with groove for self-locking as shown in FIG. 20 can be obtained, which has a buffer groove b' formed in a central portion of the top of the large thread A'.

Where a pair of dies 76 as shown in FIG. 18 are used, the metal round rod Y can be readily set either from above or sidewise to be between arcuate facing surfaces 80' of the round rod reception seats 80 which have a projecting form.

When the rolling die is used continuously, seizure or the like is liable to result. Therefore, cooling water or like cooling medium is circulated through the cooling bore R during the operation of the die to prevent the temperature thereof from rising beyond a predetermined temperature.

Further, where the round rod Y is made of a thermoplastic or thermosetting engineering plastic material, it is necessary to heat the rolling flat die up to a thermoplastic or thermositting temperature with a heater (not shown) accommodated in the heater accommodation bore R of the die.

Further, the round rod Y may be made of a ceramic material before firing.

As has been described in the foregoing, the screw with groove for self-locking according to the invention has a thread consisting of an upper portion and a lower portion in an axial section, with the lower portion having opposite side surfaces defining a flank angle of the screw and with the upper portion having opposite side surfaces substantially parallel to the radial direction, the upper portion having a buffer groove having a predetermined width and formed in the radial direction from a central portion of the top. Thus, the lower portion serves as a rigid thread portion with the side surfaces thereof in contact in a rigid state with a counterpart threaded member in a screwed relation to the counterpart threaded member, while the upper portion serves as an elastic thread portion such that its portions facing each other on the opposite sides of the buffer groove are elastically deformable in the direction of reducing the width of the buffer groove so that its opposite surfaces are in elastic contact with the counterpart threaded member. Thus, it is possible to obtain an excellent looseness prevention effect of the screw with combined actions of the rigid and elastic thread portions noted above.

Since the method of manufacturing a screw with groove using the rolling flat dies according to the invention consists of the continuous first and second steps, a time for prearrangements can be reduced, which is desired from the mass production standpoint.

By way of example, it is possible to obtain mass production of 50 to 120 products per minute with a product precision of about class 2.

An impact looseness test conducted on a screw with groove (hereinafter referred to as sample bolt) manufactured by the method according to the invention using the rolling flat dies according to the invention will now be described.

Figure 21:
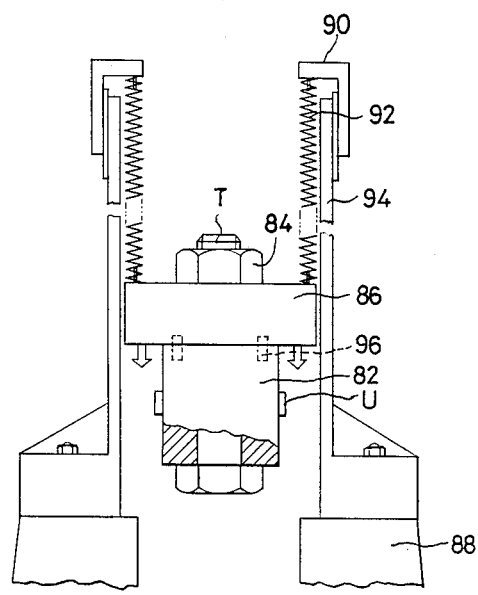
FIG. 21 is an elevational view, partly broken away, showing an impact looseness tester.
Figure 22A:
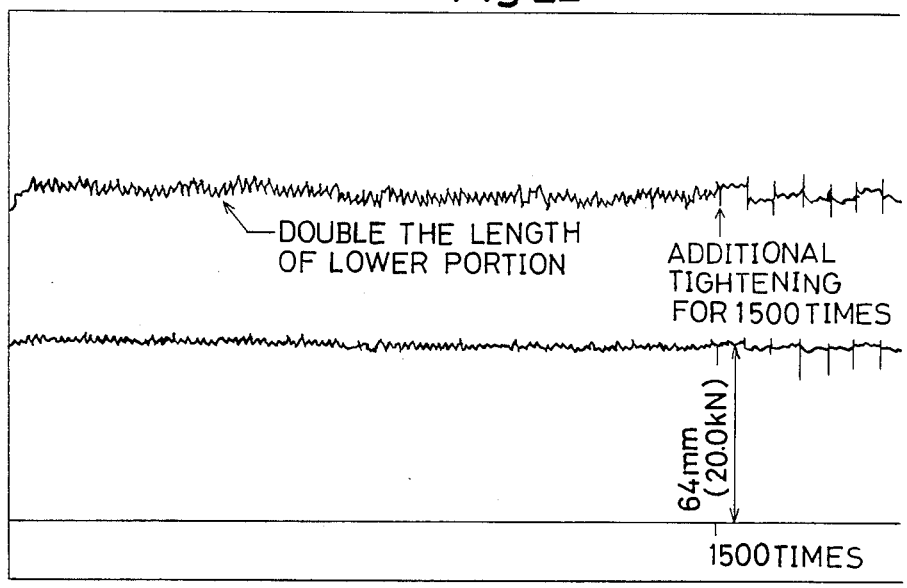
FIGS. 22(a) to 22(c) are graphs showing impact looseness test characteristics of a screw with groove.
Figure 22C:
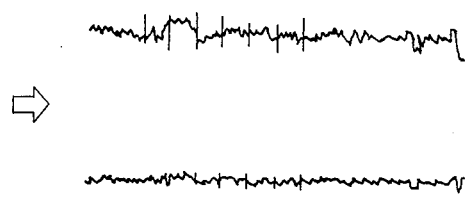
Figure 22B:
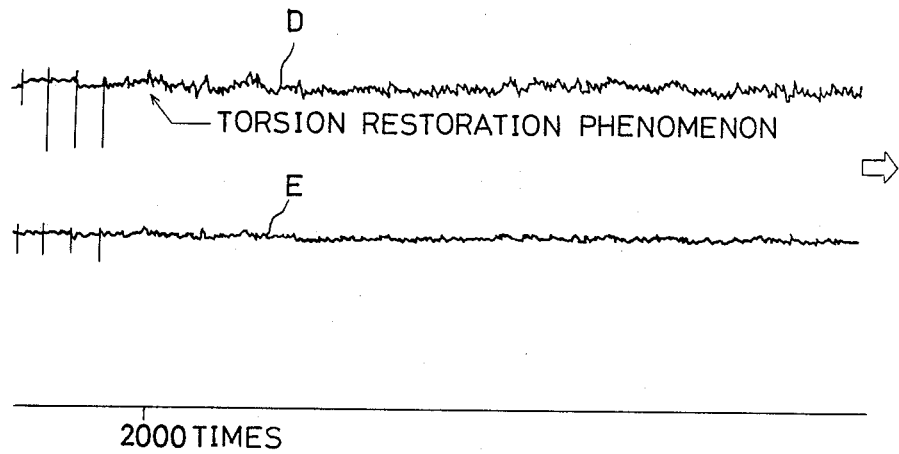
Figure 22D:
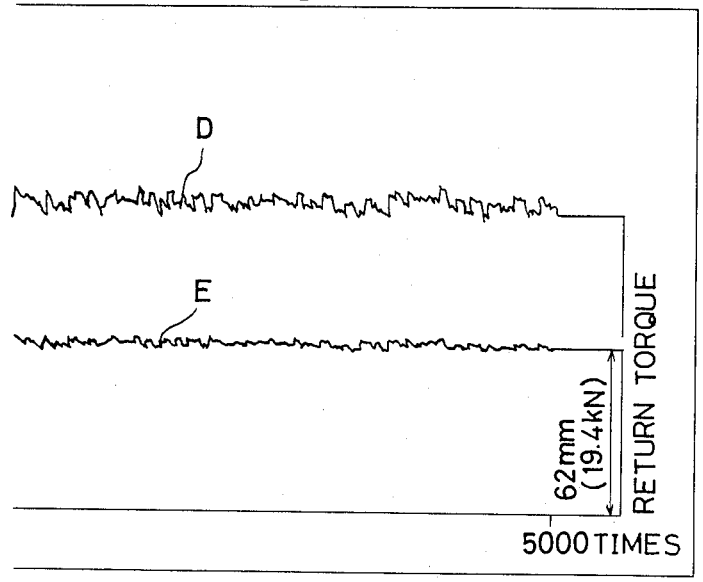

(1) TEST METHOD a. The sample bolt used was equivalent to M10 with an outer diameter of 9.30 mm and a hardness of 290 HV. The sample nut used was of 7H (class 3) with an inner diameter of 8.60 mm, an effective diameter of 9.21 mm and a hardness of 237 HV.

b. Impact looseness tester:

FIG. 21 shows the construction of the main part of the impact looseness tester. Referring to the Figure, the head of the sample bolt T is secured to a lower cylinder 82, and an upper nut 84 is tightened, thus forming a screwed system. This screwed system is allowed to fall, i.e., an upper cylinder 86 is caused to strike a bed 88.

As a result of the impact, a tensile impact force is produced in the lower cylinder 82. A compressive impact force which is generated on the contact surface of the thread A due to propagation of an impact stress wave, is detected by a strain gauge U mounted on the lower cylinder 82. The force which has to relate with the looseness of the screw is the compressive impact force.

Reference numeral 90 in the Figure designates a spring retainer, numeral 92 a tension coil spring, numeral 94 a guide cylinder, and numeral 96 a pin.

c. The test was conducted by applying #60 spindle oil to the threaded surfaces of sample bolt T and nut 84 and nut washer surfaces. The tensile impact force was set to a constant value, and the number of times of striking of the screwed system and axial force exerted to the bolt were measured.

(2) RESULTS AND CONSIDERATIONS

FIGS. 22a to 22d show 5,000-time continuous impact test data, i.e., impact looseness test characteristic graphs D and E. An average value of data measured with 42 sample bolts were obtained. As shown in FIGS. 22a to 22d, the initial axial force was set to 21.5 KN, and additional tightening was done after 1,500 times of striking.

The average axial force at this time was 20.97 KN, and a phenomenon of restoration from twist could be seen from 1,500-th to 2,000-th strikings. The axial force was substantially constant at the last, i.e., 5,000-th, striking. The average axial force at the 5,000-th striking was 20.01 KN. The difference between the axial force between the instant of additional tightening and the last striking was 0.96 KN. It will be seen that 95% of the axial force at the time of the additional tightening remained at the last striking.

Figure 23:
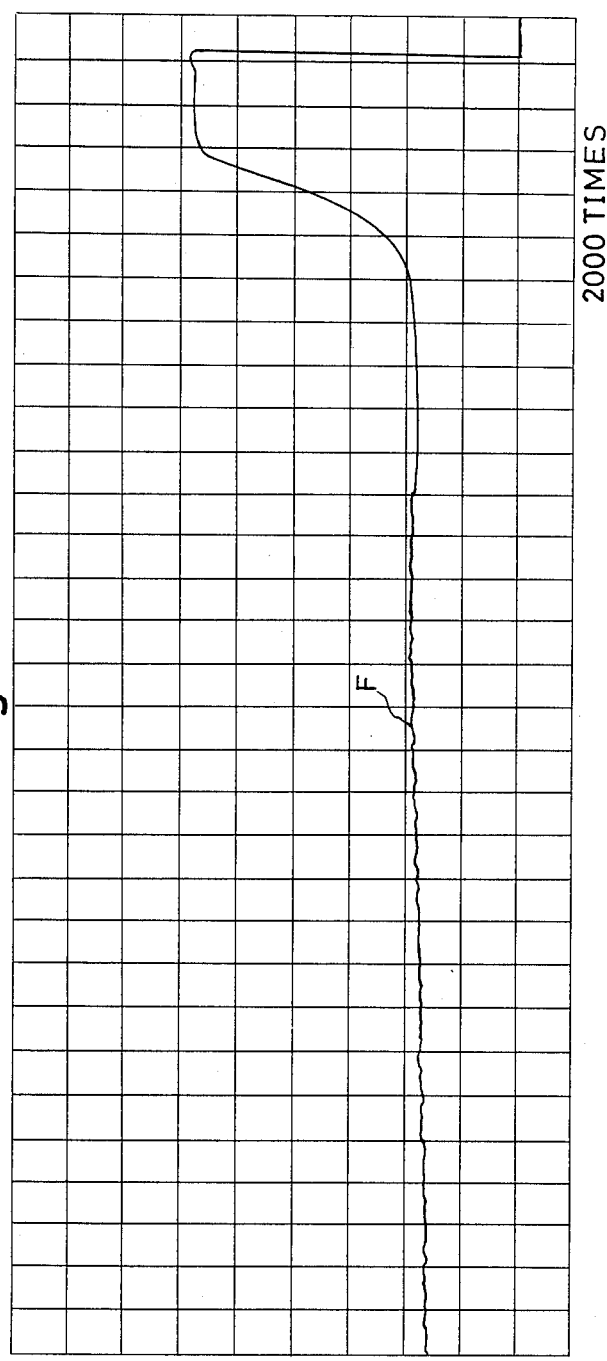

FIGS. 23 and 24 show results of comparison of impact looseness tests on a sample bolt and a commercially available bolt.

FIG. 23 shows an impact looseness characteristic graph F of the sample bolt. The axial force on relief bolt, SCM cap and SKS 305 nut suddenly increased at the 2000-th striking to 1,300 kgf and 600 kg/cm$^2$ and it is reduced to zero, that is, complete loosening is resulted, when the return torque is increased to 100 kg/cm$^2$.

FIG. 24 shows impact looseness characteristic graphs G, H and I of commercially available bolts. In the case of the graph G, the axial force on relief bolt, SCM cap and SKS 305 nut, and flat washer is suddenly increased to 1,300 kgf in 16 strikings subsequent to the 140-th striking, and it is reduced to zero to result in complete loosening when the return torque is increased to 250 kg/cm$^2$. In the case of the graph H, the axial force on relief bolt, SCM cap, SKS nut and washer is suddenly increased to 1,300 kgf in 25 strikings subsequent to the 200-th striking, and it is reduced to zero to result in complete loosening when the return torque is increased to 280 kg/cm$^2$. In the case of the graph I the axial force on relief volt, SCM cap, SKS 305 nut and washer is increased to 1,300 kgf in 25 strikings subsequent to the 180-th striking, and it is reduced to zero to result in complete loosening when the return torque is increased to 280 kg/cm$^2$.

It is made obvious from the above comparison that the sample bolt has over 10 times the impact looseness resistance of the commercially available bolts.

What is claimed is:

1. A method of manufacturing a self-locking threaded element comprising the steps of disposing a blank element in which the self-locking threads are to be formed between two spaced generally planar rolling dies, each of said rolling dies having a start end and a finish end, contacting the start ends of each die with said blank element such that one die extends from its start end to its finish end in one direction to one side of said blank element and the other die extends from its start end to its finish end in a direction opposite to said one direction to an opposite side of said blank element opposite to said one side, applying a pressure to said rolling dies such that said rolling dies are in pressure contact with said blank element, moving said two rolling dies in opposite directions a first distance, rotating said blank element a first amount as said two dies are moved said first distance causing said two oppositely moving dies to form a helical first groove in said rotating blank element with said first groove having a first depth and a first pitch, moving said dies in said opposite direction a second distance, rotating said blank element a second amount as said two dies are moved said second distance causing said two oppositely moving dies to superimpose a second deeper groove over alternate first grooves as said blank element rotates said second amount such that said deeper grooves define the flanks of a thread having a pitch which is twice that of said first pitch and with the outer radial crest ends of said thread having a self-locking center groove defined by said first groove.

2. A method according to claim 1 wherein said first amount of said rotation of said blank element is at least 360 degrees.

3. A method according to claim 1 wherein said second amount of said rotation of said blank element is at least 360 degrees.

4. A method according to claim 1 wherein said blank element has an axis of rotation, further comprising utilizing said two dies to support said blank element with said axis of rotation being vertically disposed.

5. A method according to claim 1 wherein said blank element has an axis of rotation, further comprising utilizing said two dies to support said blank element with said axis of rotation being horizontally disposed.

6. A method according to claim 1 further comprising forming said first groove with a first flank angle, forming said second groove with a second flank angle which is equal to said first flank angle.

7. A method according to claim 1 wherein said blank element is made of a material selected from the group consisting of metal, plastic, and ceramic.

8. A method according to claim 1 further comprising heating at least one of said dies while forming said grooves.

9. A method according to claim 1 further comprising cooling at least one of said dies while forming said grooves.

10. A method of manufacturing a self-locking threaded element comprising the steps of disposing a blank element in which the self-locking threads are to be formed between two spaced generally planar rolling dies, each of said rolling dies having a start end and a finish end, contacting the start ends of each die with said blank element such that one die extends from its start end to its finish end in one direction to one side of said blank element and the other die extends from its start end to its finish end in a direction opposite to said one direction to an opposite side of said blank element opposite to said one side, applying a pressure to said rolling dies such that said rolling dies are in pressure contact with said blank element, moving said two rolling dies in opposite directions a first distance, rotating said blank element a first amount as said two dies are moved said first distance causing said two oppositely moving dies to form a helical first groove in said rotating blank element with said first groove having a first depth and a first pitch, moving said dies in said opposite direction a second distance, rotating said blank element a second amount as said two dies move said second distance causing said two oppositely moving dies to superimpose a progressively deeper intermediate groove portion over alternative first grooves as said blank element rotates said second amount such that said progressively deeper intermediate groove portion has a beginning end with a depth equal to said first depth and a finish end with a depth equal to a second depth greater than said first depth, rotating said dies in said opposite direction a third distance, rotating said blank element a third amount as said two dies move said third distance causing said two oppositely moving dies to superimpose a constant depth groove over said alternate first groove and said intermediate groove portion to form a third groove of constant depth equal to said second depth, said third groove defining the flanks of a thread having a pitch which is twice that of said first pitch and with the outer radial crest ends of said thread having a self-locking center groove defined by said first groove.

11. A method according to claim 10 wherein said first amount of rotation of said blank element is at least 360 degrees and said third amount of said rotation is at least 360 degrees.

12. A method according to claim 10 wherein said blank element has an axis of rotation, further comprising utilizing said two dies to support said blank element with the said axis of rotation being vertically disposed.

13. A method according to claim 10 wherein said blank element has an axis of rotation, further comprising utilizing said two dies to support said blank element with the said axis of rotation being horizontally disposed.

14. A method according to claim 10 further comprising forming said first thread with a first flank angle, forming said third thread with a second flank angle which is equal to said first flank angle.

15. A method of manufacturing a self-locking threaded element comprising the steps of disposing a blank element in which the self-locking threads are to be formed between two spaced generally planar rolling dies, each of said rolling dies having a start end and a finish end, contacting the start ends of each die with said blank element such that one die extends from its start end to its finish end in one direction to one side of said blank element and the other die extends from its start end to its finish end in a direction opposite to said one direction to an opposite side of said blank element opposite to said one side, applying a pressure to said rolling dies such that said rolling dies are in pressure contact with said blank element, moving said two rolling dies in opposite directions a first distance, rotating said blank element a first amount as said two dies are moved said first distance causing said two oppositely moving dies to form a progressively deeper first groove portion in said rotating blank element with said progressively deeper first groove portion having a beginning end with a depth of zero and a finish end with a first depth greater than zero, said first groove portion having a first pitch, continuing to move said dies in said opposite direction a second distance, rotating said blank element a second amount as said two dies are moved said second distance causing said two oppositely moving dies to form a second groove of constant depth in said rotating blank element with said second groove being superimposed over said first groove portion and having a pitch equal to said first pitch and a constant depth equal to said second depth, continuing to move said dies in said opposite direction a third distance, rotating said blank element a third amount as said two dies are moved said third distance causing said two oppositely moving dies to superimpose a progressively deeper third groove portion over alternate second grooves as said blank element rotates said third amount such that said third groove portion has a beginning end with a depth equal to said first depth and a finish end having a second depth greater than said first depth, said third groove portion having a second pitch which is twice that of said first pitch, continuing to move said dies in said opposite direction a fourth distance, rotating said blank element a fourth amount as said two dies are moved said fourth distance causing said two oppositely moving dies to superimpose a fourth groove in said rotating blank over said third groove, said fourth groove being of constant depth equal to said second depth and having a pitch equal to said second pitch, said fourth groove defining the flanks of a thread having a pitch which is twice that of said first pitch and with the outer radial crest ends of said thread having a self-locking center groove defined by said second groove.

16. A method according to claim 15 wherein said second amount of rotation of said blank element is at least 360 degrees, and said fourth amount of said rotation is at least 360 degrees.

17. A method according to claim 15 wherein said blank element has an axis of rotation, further comprising utilizing said two dies to support said blank element with the said axis of rotation being vertically disposed.

18. A method according to claim 15 wherein said blank element has an axis of rotation further comprising utilizing said two dies to support said blank element with the said axis of rotation being horizontally disposed.

19. A method according to claim 15 further comprising forming said second groove with a first flank angle, forming said fourth groove with a second flank angle which is equal to said second flank angle.

* * * * *